US009846616B2

(12) United States Patent
Grobelny

(10) Patent No.: US 9,846,616 B2
(45) Date of Patent: Dec. 19, 2017

(54) BOOT RECOVERY SYSTEM

(71) Applicant: Dell Products L.P., Round Rock, TX (US)

(72) Inventor: Nicholas D. Grobelny, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 268 days.

(21) Appl. No.: 14/280,157

(22) Filed: May 16, 2014

(65) Prior Publication Data

US 2015/0331754 A1    Nov. 19, 2015

(51) Int. Cl.
| | | |
|---|---|---|
| G06F 11/14 | (2006.01) | |
| G06F 9/44 | (2006.01) | |
| G06F 11/07 | (2006.01) | |

(52) U.S. Cl.
CPC .......... *G06F 11/1417* (2013.01); *G06F 9/441* (2013.01); *G06F 11/0706* (2013.01); *G06F 11/0757* (2013.01); *G06F 11/1438* (2013.01); *G06F 9/4401* (2013.01); *G06F 2201/805* (2013.01)

(58) Field of Classification Search
CPC ... G06F 2201/805; G06F 9/4406; G06F 9/441
See application file for complete search history.

(56) References Cited

U.S. PATENT DOCUMENTS

| | | | | |
|---|---|---|---|---|
| 8,015,449 | B2* | 9/2011 | Sun .................... | G06F 11/1417 713/2 |
| 8,135,881 | B1* | 3/2012 | Obkircher .......... | G06F 13/4291 710/3 |
| 2003/0154336 | A1* | 8/2003 | Ballantyne .......... | G06F 13/385 710/110 |
| 2006/0239104 | A1* | 10/2006 | Lee .................... | G11C 8/06 365/230.01 |
| 2007/0288737 | A1* | 12/2007 | Boyle ................. | G06F 8/65 713/1 |
| 2008/0104282 | A1* | 5/2008 | Lee .................... | G06F 13/4291 710/5 |

(Continued)

OTHER PUBLICATIONS

Intel, Enhanced Serial Peripheral Interface (eSPI) Interface Base Specification, Revision 0.75, published Jun. 2013.*

*Primary Examiner* — Nitin Patel
*Assistant Examiner* — Kevin Stewart
(74) *Attorney, Agent, or Firm* — Haynes and Boone, LLP

(57) ABSTRACT

A boot recovery system includes a serial peripheral interface (SPI) storage that stores a primary boot block. A primary SPI controller is connected to the SPI storage through a primary SPI bus. An embedded controller (EC) includes an EC storage that stores a recovery boot block. The EC is coupled to the primary SPI bus through a secondary SPI bus. The EC is configured to determine that the primary boot block should be replaced, retrieve the recovery boot block from the EC storage, replace the primary boot block in the SPI storage with the recovery boot block through the secondary SPI bus, and initiate an information handling system (IHS) reboot process. The determining, retrieving, replacing, and initiating may be performed by the EC while a processing system that is coupled to the primary SPI controller is not in an operating mode.

18 Claims, 3 Drawing Sheets

(56) References Cited

U.S. PATENT DOCUMENTS

| | | | | |
|---|---|---|---|---|
| 2008/0288767 | A1* | 11/2008 | Wang | G06F 11/1417 |
| | | | | 713/2 |
| 2009/0125709 | A1* | 5/2009 | Martinez | G06F 9/4416 |
| | | | | 713/2 |
| 2009/0271660 | A1* | 10/2009 | Chin | G06F 11/1417 |
| | | | | 714/15 |
| 2011/0093741 | A1* | 4/2011 | Liang | G06F 11/1417 |
| | | | | 714/6.1 |
| 2013/0138940 | A1* | 5/2013 | Wang | G06F 11/1417 |
| | | | | 713/2 |
| 2013/0185549 | A1* | 7/2013 | Hu | G06F 9/4401 |
| | | | | 713/2 |
| 2014/0006764 | A1* | 1/2014 | Swanson | G06F 9/4406 |
| | | | | 713/2 |
| 2015/0100716 | A1* | 4/2015 | Rencs | G06F 13/385 |
| | | | | 710/308 |

* cited by examiner

BOOT RECOVERY SYSTEM

BACKGROUND

The present disclosure relates generally to information handling systems, and more particularly to a boot recovery system for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventional IHS's typically include a boot system such as, for example, a Basic Input/Output System (BIOS) that operates to, for example, initialize and test the IHS hardware components, load an operating system from the IHS memory or storage device, and/or perform a variety of other BIOS actions known in the art during an IHS boot process. In some situations, the BIOS can fail such that the operating system does not load. Causes of BIOS failure include BIOS corruption, a missing BIOS, a misconfigured BIOS, and/or a variety of other BIOS failure causes known in the art. In the case of missing or corrupt BIOS, a user may be unable to access the BIOS to correct the problem. One conventional solution to a missing or corrupt BIOS includes reinstalling the BIOS from a copy that is stored in a separate chip, but such solutions require a motherboard that is usable without a working BIOS and an processor that can operate to perform the BIOS reinstall process. If the motherboard is unusable without a working BIOS, the user typically will be required to obtain a replacement chip that includes a working BIOS from the motherboard manufacturer.

Accordingly, it would be desirable to provide an improved BIOS recovery system.

SUMMARY

According to one embodiment, an information handling system (IHS) includes a processing system; a primary boot block storage that stores a primary boot block; and an embedded controller (EC) that includes an EC storage that stores a recovery boot block, wherein the EC is coupled to the primary boot block storage through a secondary serial peripheral interface (SPI), and wherein the EC is configured, while the processing system is not in an operating mode, to: determine that the primary boot block should be replaced; retrieve the recovery boot block from the EC storage; replace the primary boot block in the primary boot block storage with the recovery boot block through the secondary SPI; and initiate an information handling system (IHS) reboot process.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
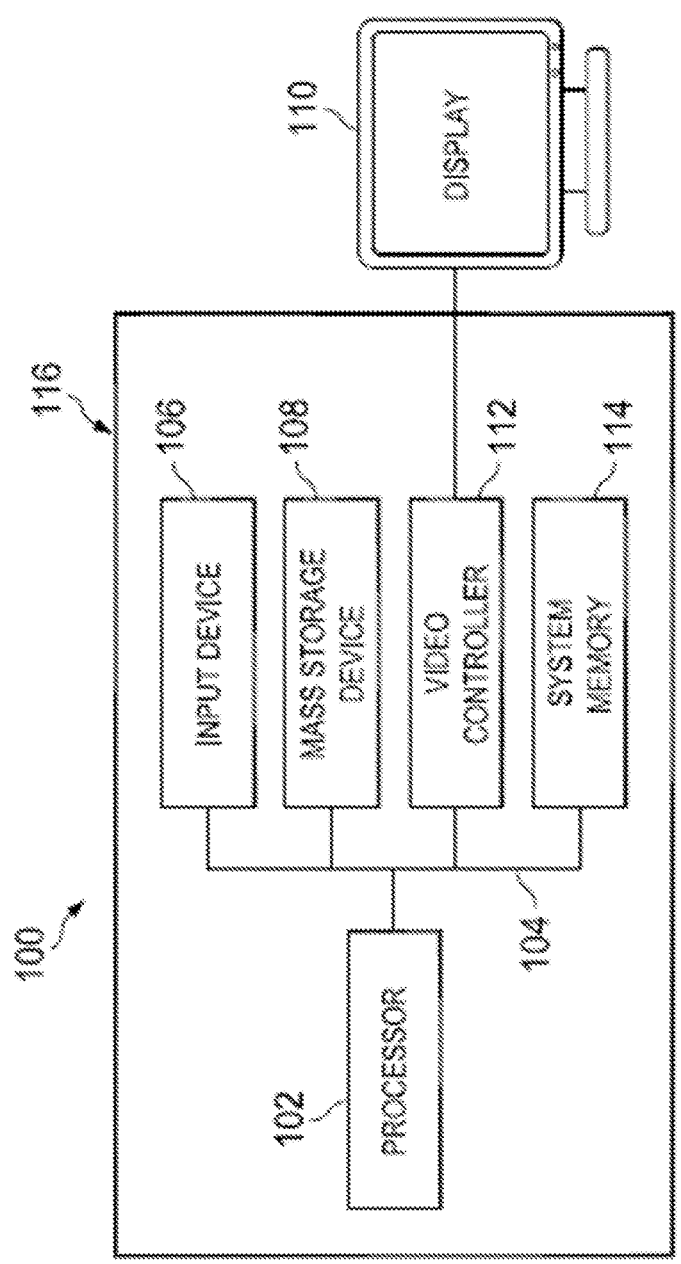
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
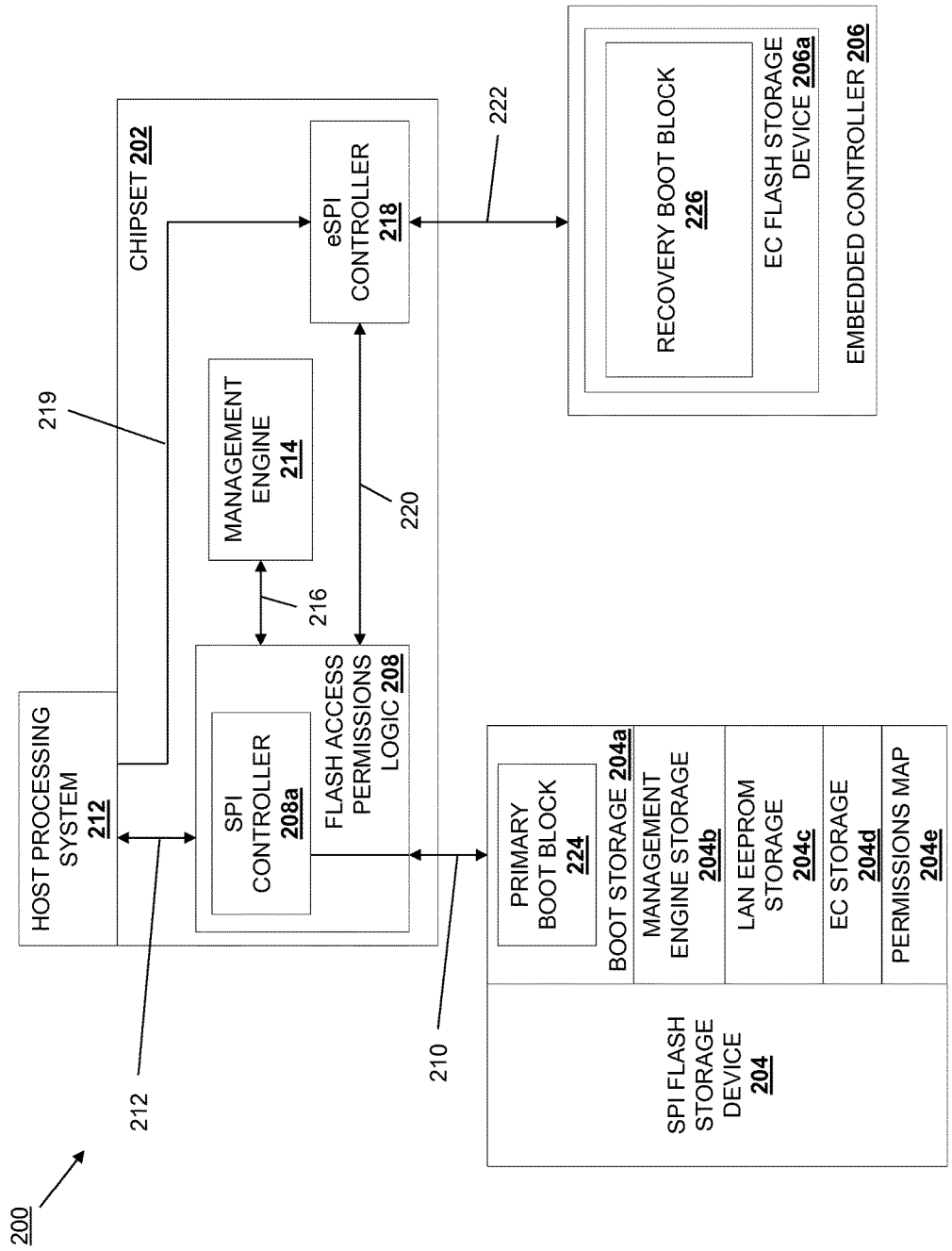
FIG. 2 is a schematic view illustrating an embodiment of a boot recovery system.

Referring now to FIG. 2, an embodiment of a boot recovery system 200 is illustrated. The boot recovery system 200 includes a chipset 200 that, for example, may be included in the IHS 100 discussed above with reference to FIG. 1 and that may include one or more components of an integrated circuit that manages information flow between a processing system in the IHS 100 (e.g., the processor 102), a memory system in the IHS 100 (e.g., the system memory 114), peripheral devices coupled to the IHS 100, and/or a variety of other components of the IHS 100. In some examples, the chipset 202 is included in a circuit board (e.g., a motherboard) in the IHS 100. However, other locations of the chipset 202 are envisioned as falling within the scope of the present disclosure.

The boot recovery system 200 also includes a storage that, in the illustrated embodiment, includes a Serial Peripheral Interface (SPI) flash storage device 204. However, other types of storage devices used by controllers other than primary SPI controllers (discussed below) will fall within the scope of the present disclosure. The SPI flash storage device 204 provides address space for a boot storage 204a, a management engine storage 204b, a Local Area Network (LAN) Electrically Erasable Programmable Read-Only Memory (EEPROM) storage 204c, an embedded controller storage 204d, and a permissions map 204e (e.g., a flash access permissions map or descriptor). The boot recovery system 200 also includes an embedded controller (EC) 206 having an EC storage that, in the illustrated embodiment, includes an EC flash storage device 206a.

The chipset 202 includes a flash access permissions logic 208 that provides logic for controlling access to the SPI flash storage device 204 (e.g., using the permissions map 204e.) In the illustrated embodiment, the flash access permissions logic 208 provides a primary SPI controller 208a that operates to control access to address space in the SPI flash storage device 204 through a primary SPI bus 210. In the illustrated embodiment, a host processing system 212, which may include the processor 102 in the IHS 100 of FIG. 1, has direct access to address space on the SPI flash storage device 204 (e.g., the boot storage 204a, the LAN EEPROM storage 204c, etc.) via the primary SPI controller 208a through a coupling 212 to the flash access permissions logic 208. The host processing system 212 may include a processor, operating system software, a BIOS, and/or a variety of other host processing system components known in the art.

In the illustrated embodiment, the chipset 202 includes a management engine 214 that has direct access to address space on the SPI flash storage device 204 (e.g., the management engine storage 204b) via the primary SPI controller 208a through a coupling 216 to the flash access permissions logic 208. In some embodiments, the management engine 214 may be coupled to, for example, a remote access controller (not illustrated) such as, for example, the integrated Dell Remote Access Controller (iDRAC) available from Dell Inc. of Round Rock, Tex., that may include an interface card that is coupled to a network (e.g., a Local Area Network (LAN), the Internet, etc.). In the illustrated embodiment, the chipset 202 includes a secondary SPI controller (distinguished from the primary SPI controller 208a) that, in the illustrated embodiment, is an enhanced SPI (eSPI) controller 218. As is known in the art, primary SPI controllers such as the primary SPI controller 208a conventionally operate to map addresses received from the host processing system 212 to addresses for devices coupled to the primary SPI bus 210 such that the host processing system 212 can access those devices. Secondary SPI controllers such as the eSPI controller 218 were created to allow the host processing system 212 to access the embedded controller 206 directly (e.g., via a bus 219), and to allow the embedded controller 206 to retrieve and/or store addresses used by the primary SPI controller 208a to map to the devices coupled to the primary SPI bus 210 (e.g., such that the embedded controller 206 could access the EC storage 204d that is provided on the SPI flash storage device 204) through a coupling 220. As discussed in further detail below, the systems and methods of the present disclosure provide for the utilization of the eSPI controller 218 by the embedded controller 206 to replace a primary boot block 224 in the boot storage 204a of the SPI flash storage device 204.

The secondary SPI controller 218 provides for has direct access to address space on the SPI flash storage device 204 (e.g., the boot storage 204a) via the primary SPI bus 210 through the coupling 220 to the flash access permissions logic 208. The secondary SPI controller 218 provides direct access to address space on the SPI flash storage device 204 to the EC 206 through a secondary SPI bus 222 (e.g., an eSPI bus). As discussed below, the secondary SPI bus 222 and secondary SPI controller 218 may be active in any or all of the reduced power states defined by the Advanced Configuration and Power Interface (ACPI) specification, including but not limited to the G1/"sleep" states (S1, S2, S3, and S4) and G2/S5 state. As such, the secondary SPI bus 222 and secondary SPI controller 218 may be used by the EC 206 to directly access address space on the SPI flash storage device 204 when the host processing system 212 is not in an operating mode.

In the illustrated embodiment, a primary boot block 224 is stored in the boot storage 204a in the SPI flash storage device 204, and a recovery boot block 226 is stored in the EC flash storage device 206a. In the example of the boot recovery system 200 discussed below, the boot system is a BIOS boot system such that the primary boot block 224 is a BIOS boot block and the recovery boot block 226 is a recovery BIOS boot block. However, other boot systems including, for example, the Unified Extensible Firmware Interface (UEFI) system, are envisioned as falling within the scope of the present disclosure. Each of the primary boot block 224 and the recovery boot block 226 may provide a portion of BIOS software that is run first and that is updated separately from the remainder of the BIOS, and that operates to verify if the rest of the BIOS is intact before transferring control to it. As such, the recovery boot block 226 may be (at least initially) identical to the primary boot block 224 (e.g., prior to any errors being introduced into the primary boot block 224).

Figure 3:
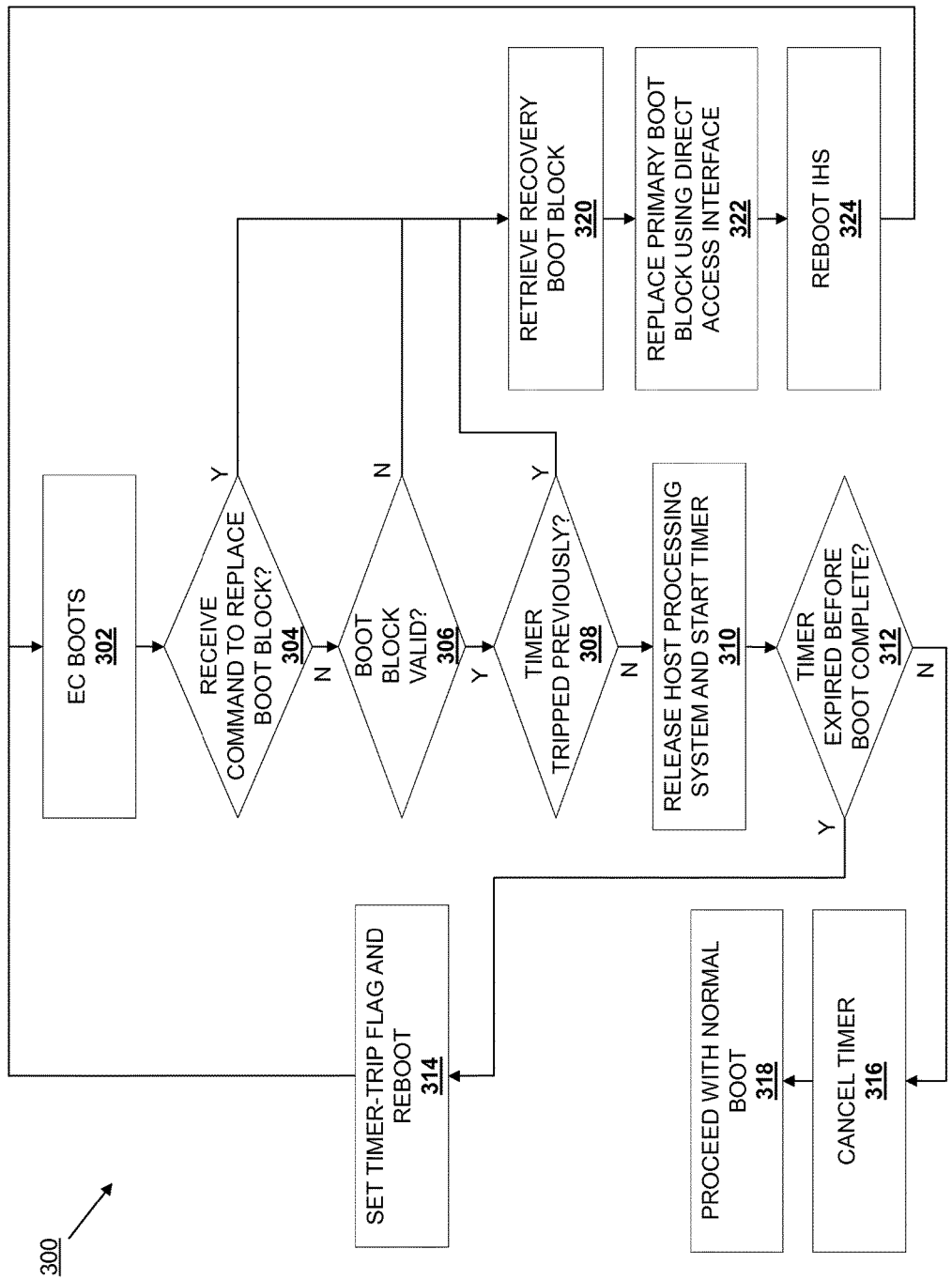
FIG. 3 is a flow chart illustrating an embodiment of a method for boot recovery.

Referring now to FIG. 3, an embodiment of a method 300 for boot recovery is illustrated. The method 300 begins at block 302 where the embedded controller boots. In an embodiment, a user may power-on, reset, or otherwise initiate a boot of an IHS (e.g., the IHS 100 discussed above with reference to FIG. 1) that includes the boot recovery system 200 and, in response the EC 206 will boot at block 302. As is known in the art, the EC 206 may include an EC processing system and an EC memory system that includes instructions that, when executed by the EC processing system, cause the EC processing system to perform the functions of the EC 206 discussed below. At block 302, the EC 206 may perform an initial set of operations (e.g., in response to a power-on or reset of the IHS) that allow the EC 206 to perform the remaining blocks of the method 300. In some embodiments, the EC 206 may hold the host processing system 212 (e.g., the processor 102) in a non-operational mode such as, for example, a reset mode, during and/or following the booting of the EC 206 at block 302. In the specific illustrated example, the EC 206 operates to hold the host processing system 212 in a reset mode while the EC 206 determines whether to utilize the recovery boot block 226, discussed in further detail below.

The method 300 then proceeds to decision block 304 where it is determined whether a command has been received to replace the primary boot block. In an embodiment, the EC 206 operates to determine whether a command has been received to replace the primary boot block 224 in the boot storage 204a of the SPI flash storage device 204. In some embodiments, systems other than the IHS may send a primary boot block replacement command to the IHS to replace the primary boot block 224. For example, a remote management system may send a primary boot block replacement command (or other out-of-band request) over the network to the management engine 214 via a remote access controller while the IHS is reduced power state or non-operating mode. As such, following the EC boot at block 302, the EC 206 may operate to check whether a command to replace the primary boot block was received. While a specific example of a primary boot block replacement command sent from a remote management system over a network while the IHS system is powered down has been provided, a wide variety of commands to replace the primary boot block may be received from different systems at different times and while the IHS is in different operating states while remaining within the scope of the present disclosure.

If, at decision block 304, it is determined that no command to replace the primary boot block was received, the method 300 then proceeds to decision block 306 where it is determined whether the primary boot block is valid. In an embodiment, the EC 206 operates to determine whether the primary boot block 224 in the boot storage 204a of the SPI flash storage device 204 is valid. For example, at decision block 306, the EC 206 may directly access the primary boot block 224 in the boot storage 204a of the SPI flash storage device 204 through the secondary SPI bus 222 and secondary SPI controller 218 and operate to perform a checksum operation, hash operation, and/or other validity determination operation on the primary boot block 224 to determine whether the primary boot block 224 is bad, missing, or otherwise whether errors exist in the primary boot block 224 such that the primary boot block 224 may be invalid. While a specific example of determining the validity of a primary boot block has been provided, a wide variety of systems and methods may be used to determine whether a primary boot block is valid while remaining within the scope of the present disclosure.

If, at decision block 306, it is determined that the primary boot block is valid, the method 300 then proceeds to decision block 308 where it is determined whether a timer was tripped during a previous boot of the IHS. In an embodiment, the EC 206 may include, or have access to, a timer (e.g., a "watchdog timer"), discussed in further detail below, that may be initiated in response to an IHS boot process and used to determine whether that IHS boot process has taken too long and should be restarted. At decision block 308, the EC 206 may operate to determine whether that timer was tripped during the previous IHS boot process to determine whether that previous IHS boot process failed. For example, at decision block 308, the EC 206 may access a memory location (e.g., in the EC 206, in the chipset 202, etc.) and operate to check whether a flag (referred to below as a "timer-trip" flag) was set in that memory location during a previous performance of the method 300. While a specific example of the determination of whether a previous boot of the IHS failed, a wide variety of systems and methods may be used to determine whether a boot of an IHS previously failed while remaining within the scope of the present disclosure.

If, at decision block 308, it is determined that a timer was not tripped during a previous boot of the IHS, the method 300 then proceeds to block 310 where the host processing system is released and a timer is started. As discussed above, in some embodiments the EC 206 may hold the host processing system 212 (e.g., the processor 102) in a non-operational mode such as, for example, a reset mode or a reduced power mode, during and following the booting of the EC 206 at block 302 while the EC 206 determines whether to utilize the recovery boot block 226 at decisions blocks 304, 306, and 308. In such embodiments, at block 310 the EC 206 may release the host processing system 212 (e.g., release the processor 202 from a reset mode) such that a BIOS in the host processing system 212 may attempt to perform BIOS operations. In addition, in an embodiment of block 310, the EC 206 may operate to initiate the timer (e.g., a watchdog timer) and begin monitoring the IHS boot process. For example, the EC 206 may operate at block 310 to initiate the timer that was checked at decision block 308 and begin monitoring (via the secondary SPI bus 222) the IHS boot process using the primary boot block 224.

The method 300 then proceeds to decision block 312 where it is determined whether the timer has expired prior to the completion of an IHS boot process. In an embodiment, the EC 206 operates to monitor the timer initiated at block 310 and determine whether that timer has expired. For example, the timer initiated at block 310 may be configured to expire after a time period that is indicative of a problem with the IHS boot process. If at decision block 312, the EC 206 determines that the timer has expired, the method 300 then proceeds to block 314 where a timer-trip flag is set and the IHS is rebooted. In an embodiment of block 314, the EC 206 operates to set a timer-trip flag and cause the IHS to reboot. For example, the EC 206 may set the timer-trip flag in the memory location that was checked at decision block 308, and then send a signal to the host processing system 212 to cause the host processing system 212 to reboot. The method 300 then proceeds back to block 302. One of skill in the art in possession of the present disclosure will recognize that the setting of the timer-trip flag at block 314 and causing the IHS to reboot may cause the method 300 to eventually proceed back to decision block 308 where it will then be determined that the timer was tripped during a previous boot of the IHS (i.e., based on the setting of the timer-trip flag by the EC 206.)

If, at decision block 312, it is determined that the timer has not expired prior to the completion of an IHS boot process, the method 300 proceeds to block 316 where the timer is cancelled. In an embodiment, the EC 206 operates to cancel the timer initiated at block 310. For example, as discussed above, the timer initiated at block 310 may be configured to expire after a time period that is indicative of a problem with the IHS boot process, and a determination that the timer has not expired at decision block 312 is indicative that the IHS boot process is operating normally and has completed. In some examples of block 316, the EC 206 may cancel the timer in response to the host processing system 212 entering BIOS setup (e.g., by providing a BIOS configuration menu), in response to the host processing system 212 starting full BIOS recovery, and/or in response to a variety of other events known in the art that are indicative of a normal IHS boot process completing. The method 300 then proceeds to block 318 where the host processing system 212 proceeds with a normal boot process.

Returning back to decision blocks 304, 306, and 308, if at decision block 304 it is determined that a command to replace the primary boot block has been received, or if at decision block 306 it is determined that the primary boot block is not valid, or if at decision block 308 it is determined that the timer was tripped during a previous boot of the IHS, the method 300 then proceeds to block 320 where a recovery boot block is retrieved. In an embodiment of block 320, the EC 206 operates to retrieve the recovery boot block 226 from the EC Flash storage device 206a. The method 300 then proceeds to block 322 where the primary boot block is replaced using a direct access interface. In an embodiment, the EC 206 replaces the primary boot block 224 with the recovery boot block 226 using the secondary SPI bus 222 and secondary SPI controller 218 to directly access the address space on the SPI flash storage device 204 that is designated for the boot storage 204a, and replaces the primary boot block 224 with the recovery boot block 226. As discussed above, the secondary SPI controller 218 provides direct access to address space designated for the boot storage 204 on the SPI flash storage device 204 (e.g., via the coupling 220 to the flash access permissions logic 208 and the primary SPI bus 210), and allows the EC 206 to utilize the secondary SPI bus 222, the secondary SPI controller 218, the coupling 220, and the primary SPI bus 210 as a direct access interface to replace the primary boot block 224. As also discussed above, the secondary SPI bus 222 and secondary SPI controller 218 allow the EC 206 to perform block 322 while the host processing system is in a reduced power state or otherwise not in an operating mode (e.g., while the EC 206 holds the host processing system 212 in a non-operational mode such as, for example, a reset mode). The method 300 then proceeds to block 324 where the IHS is rebooted. In an embodiment of block 324, the EC 206 operates to cause the host processing system 212 to reboot following the replacement of the primary boot block 224 with the recovery boot block 226. One of skill in the art in possession of the present disclosure will recognize that following the replacement of the primary boot block with the recovery boot block at block 322, the reboot of the IHS 324 should cause the method 300 to proceed as discussed above to block 318 where the normal boot of the IHS occurs (i.e., because the boot block being used has been replaced, is valid, and/or is not associated with the timer expiring during a previous boot attempt.)

Thus, systems and methods have been described that provide for boot recovery without the need for an operating host processing system. Utilizing a direct access interface such as, for example, a secondary or enhanced Serial Peripheral Interface bus, an embedded controller may determine whether a primary boot block should be replaced (i.e., based on a replacement command, a failed previous boot, a determination of boot block errors, etc.) and directly access a boot storage to replace the primary boot block with a recovery boot block that is stored in the embedded controller. This replacement of corrupted or damaged boot blocks may be performed while the host processing system in the IHS is in an off mode, a sleep mode, a reset mode, and/or any other reduced power mode known in the art, providing substantial benefits over conventional systems in which BIOS recovery requires reinstallation of the BIOS from a copy that is stored in a separate chip, along with host processing system that can operate to perform the BIOS reinstall process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A boot recovery system, comprising:
   a serial peripheral interface (SPI) storage that stores a primary boot block;
   a primary SPI controller connected to the SPI storage through a primary SPI bus;
   an embedded controller (EC) that includes an EC storage that stores a recovery boot block, and an EC processing system that is coupled to the SPI storage through:
      a secondary SPI bus that directly connects the EC processing system to a secondary SPI controller;
      a primary/secondary SPI controller coupling that directly connects the secondary SPI controller to the primary SPI controller; and
      the primary SPI bus that directly connects the primary SPI controller to the SPI storage; and
   a host processing system that is directly connected to the secondary SPI controller through a secondary SPI controller/host processing system bus that, along with the secondary SPI bus, allows the host processing system to access the EC directly when the host processing system is in an operational mode, wherein the EC processing system is configured to hold the host processing system in a non-operational mode and:
      determine that the primary boot block should be replaced;
      retrieve the recovery boot block from the EC storage;
      replace the primary boot block in the SPI storage with the recovery boot block through the secondary SPI bus, the primary/secondary SPI controller coupling, and the primary SPI bus; and
      initiate an information handling system (IHS) reboot process.

2. The boot recovery system of claim 1, wherein the EC processing system is further configured to:
   monitor an IHS boot process that uses the primary boot block through the secondary SPI bus.

3. The boot recovery system of claim 1, wherein the EC processing system is configured to determine that the primary boot block should be replaced in response to at least one of:
   receiving a command to replace the primary boot block;
   determining that the primary boot block is not valid; and
   determining that a timer was tripped during a previous IHS boot process.

4. The boot recovery system of claim 1, wherein the secondary SPI bus provides a direct access interface for the EC processing system to determine that the primary boot block should be replaced and access the SPI storage to replace the primary boot block with the recovery boot block.

5. The boot recovery system of claim 1, wherein the EC processing system is further configured to:
   determine that the primary boot block does not need to be replaced;
   cause the host processing system that is coupled to the primary SPI controller to enter an operating mode; and
   determine whether a timer has expired.

6. The boot recovery system of claim 5, wherein the EC processing system is further configured to:
   determine that the timer has not expired and, in response, cancel the timer and allow an IHS boot process that uses the primary boot block to proceed; and
   determine that the timer has expired and, in response, set a timer-trip flag and cause the IHS boot process that uses the primary boot block to reboot.

7. An information handling system (IHS), comprising:
a processing system;
a primary boot block storage that stores a primary boot block;
a primary serial peripheral interlace (SPI) controller directly connected to the primary boot block storage through a primary SPI bus;
a secondary SPI controller directly connected to the primary SPI controller through a primary/secondary SPI controller coupling;
an embedded controller (EC) that includes an EC storage that stores a recovery boot block, wherein the EC is coupled to the primary boot block storage through a secondary SPI bus that is directly connected to the secondary SPI controller, the primary/secondary SPI controller coupling, and the primary SPI bus;
a processing system that is directly connected to the secondary SPI controller through a secondary SPI controller/processing system bus,
wherein the secondary SPI controller provides the processing system with direct access to the EC when the processing system is in at least one operating mode, and
wherein the EC is configured, while a processing system is not in the at least one operating mode, to:
determine that the primary boot block should be replaced;
retrieve the recovery boot block from the EC storage;
replace the primary boot block in the primary boot block storage with the recovery boot block through the secondary SPI bus, the primary/secondary SPI controller coupling, and the primary SPI bus; and
initiate an information handling system (IHS) reboot process.

8. The IHS of claim 7, wherein the EC is further configured to:
monitor an IHS boot process that uses the primary boot block through the secondary SPI bus.

9. The IHS of claim 7, wherein the EC is configured to determine that the primary boot block should be replaced in response to at least one of:
receiving a command to replace the primary boot block;
determining that the primary boot block is not valid; and
determining that a timer was tripped during a previous IHS boot process.

10. The IHS of claim 7, wherein the EC if further configured to:
hold the processing system in a reset mode such that the processing system is not in the operating mode.

11. The IHS of claim 7, wherein the EC is further configured to:
determine that the primary boot block does not need to be replaced;
cause the processing system to enter an operating mode; and
determine whether a timer has expired.

12. The IHS of claim 11, wherein the EC is further configured to:
determine that the timer has not expired and, in response, cancel the timer and allow an IHS boot process that uses the primary boot block to proceed; and
determine that the timer has expired and, in response, set a timer-trip flag and cause the IHS boot process that uses the primary boot block to reboot.

13. A method for boot recovery, comprising:
causing, by an embedded controller (EC), a host processing system to remain in a non-operational mode;
determining, by the EC while the host processing system is in the non-operational mode, that a primary boot block should be replaced;
retrieving, by the EC while the host processing system is in the non-operational mode, a recovery boot block from an EC storage included in the EC;
replacing, by the EC while the host processing system is in the non-operational mode, the primary boot block with the recovery boot block in a primary boot block storage via:
a secondary serial peripheral interface (SPI) bus that is directly connected to a secondary SPI controller;
a primary/secondary SPI controller coupling that directly connects the secondary SPI controller to a primary SPI controller; and
a primary SPI bus that directly connects the primary SPI controller to the primary boot block storage;
initiating, by the EC while the host processing system is in the non-operational mode, an information handling system (IHS) reboot process; and
providing, by the EC while the host processing system is in an operational mode, the host processing system with direct access to the EC through a secondary SPI controller/host processing system bus that directly connects the host processing system to the secondary SPI controller.

14. The method of claim 13, further comprising:
monitoring, by the EC through the secondary SPI bus, an IHS boot process that uses the primary boot block.

15. The method of claim 13, wherein the determining, by the EC, that the primary boot block should be replaced includes at least one of:
receiving, by the EC, a command to replace the primary boot block;
determining, by the EC, that the primary boot block is not valid; and
determining, by the EC, that a timer was tripped during a previous IHS boot process.

16. The method of claim 13, wherein the secondary SPI bus provides a direct access interface for the EC to determine that the primary boot block should be replaced and access the primary boot block storage to replace the primary boot block with the recovery boot block.

17. The method of claim 13, further comprising:
determining, by the EC, that the primary boot block does not need to be replaced;
causing, by the EC, a processing system that is coupled to the secondary SPI bus to enter an operating mode; and
determining, by the EC, whether a timer has expired.

18. The method of claim 17, further comprising:
determining, by the EC, that the timer has not expired and, in response, cancelling the timer and allowing an IHS boot process that uses the primary boot block to proceed; and
determining, by the EC, that the timer has expired and, in response, setting a timer-trip flag and causing the IHS boot process that uses the primary boot block to reboot.

* * * * *

UNITED STATES PATENT AND TRADEMARK OFFICE
CERTIFICATE OF CORRECTION

PATENT NO. : 9,846,616 B2
APPLICATION NO. : 14/280157
DATED : December 19, 2017
INVENTOR(S) : Grobelny It is certified that error appears in the above-identified patent and that said Letters Patent is hereby corrected as shown below:

In the Claims

In Claim 7, Column 9, Line 5: please replace "interlace" with --interface--.

Signed and Sealed this
Twenty-fourth Day of July, 2018

Andrei Iancu
*Director of the United States Patent and Trademark Office*